US012686037B2

(12) United States Patent
Nakamura et al.

(10) Patent No.: US 12,686,037 B2
(45) Date of Patent: Jul. 21, 2026

(54) SUBSTRATE TREATMENT APPARATUS AND PROCESSING METHOD OF SUBSTRATE

(71) Applicant: SHIBAURA MECHATRONICS CORPORATION, Kanagawa (JP)

(72) Inventors: Satoshi Nakamura, Kanagawa (JP); Kensuke Demura, Kanagawa (JP); Masaya Kamiya, Kanagawa (JP)

(73) Assignee: SHIBAURA MECHATRONICS CORPORATION, Kanagawa (JP)

( * ) Notice: Subject to any disclaimer, the term of this patent is extended or adjusted under 35 U.S.C. 154(b) by 133 days.

(21) Appl. No.: 18/895,864

(22) Filed: Sep. 25, 2024

(65) Prior Publication Data

US 2025/0108411 A1 Apr. 3, 2025

(30) Foreign Application Priority Data

Sep. 29, 2023 (JP) ................................ 2023-169970

(51) Int. Cl.
*B08B 3/12* (2006.01)
*B08B 7/00* (2006.01)

(52) U.S. Cl.
CPC .............. *B08B 3/12* (2013.01); *B08B 7/0092* (2013.01)

(58) Field of Classification Search
None
See application file for complete search history.

(56) References Cited

U.S. PATENT DOCUMENTS

2008/0121251 A1* 5/2008 Miya ........................ H10P 70/20 134/4
2018/0047559 A1 2/2018 Kamiya et al.
2022/0310417 A1* 9/2022 Nakamura .......... H10P 72/0414

FOREIGN PATENT DOCUMENTS

JP 2018-026436 A 2/2018

* cited by examiner

*Primary Examiner* — Kaj K Olsen
*Assistant Examiner* — Pradhuman Parihar
(74) *Attorney, Agent, or Firm* — McDonald Hopkins LLC

(57) ABSTRACT

According to one embodiment a substrate treatment apparatus removes foreign matter from a surface of a substrate by forming a frozen film at the surface of the substrate, incorporating, into the frozen film, the foreign matter adhered to the surface of the substrate, and thawing the frozen film including the foreign matter. A liquid supply part that supplies a liquid to the frozen film including the foreign matter, a vibrating part that faces the frozen film, and a controller that controls the vibrating part are included. The controller controls the vibrating part to transmit a vibration to a liquid film, which includes the liquid supplied to the frozen film and a liquid generated by the thawing of the frozen film, and to reduce an energy of the vibration transmitted to the liquid film or stop the vibration according to a position of an upper surface of the frozen film under the liquid film.

20 Claims, 9 Drawing Sheets

SUBSTRATE TREATMENT APPARATUS AND PROCESSING METHOD OF SUBSTRATE

CROSS-REFERENCE TO RELATED APPLICATIONS

This application is based upon and claims the benefit of priority from the Japanese Patent Application No. 2023-169970, filed on Sep. 29, 2023; the entire contents of which are incorporated herein by reference.

FIELD

Embodiments of the invention relate to a substrate treatment apparatus and a processing method of a substrate.

BACKGROUND

Freeze cleaning has been proposed as a method of removing foreign matter such as particles and the like adhered to a surface of a substrate such as an imprint template, a photolithography mask, a semiconductor wafer, etc.

Freeze cleaning generally uses purified water as the liquid used in the cleaning. For example, in freeze cleaning, first, purified water and a cooling gas are supplied to the surface of a rotating substrate. Then, the supply of the purified water is stopped, and a water film is formed on the surface of the substrate while discharging a portion of the supplied purified water. The water film is frozen by the supplied cooling gas. When the water film freezes to form a frozen film, foreign matter such as particles and the like are detached from the surface of the substrate by being incorporated into the frozen film. Then, a thawing process of the frozen film is performed. In the thawing process, the frozen film is thawed by supplying purified water to the frozen film; and the foreign matter is discharged outside the substrate together with the purified water by a centrifugal force.

The foreign matter removal rate can be increased by performing such freeze cleaning. In recent years, however, it is desirable to further improve the foreign matter removal rate. In such a case, by transmitting a vibration to the liquid at the front side of the substrate in the thawing process of the frozen film, foreign matter that detached from the surface of the substrate can be prevented from re-adhering to the surface of the substrate, etc. Therefore, the foreign matter removal rate can be further improved.

However, because a fine pattern is formed in the surface of the substrate, there is a risk that the pattern may be damaged if a vibration is simply transmitted to the liquid.

It is therefore desirable to develop a substrate treatment apparatus and a processing method of a substrate in which the occurrence of damage of a pattern in a surface of a substrate can be suppressed even when a vibration is transmitted to a liquid at the front side of the substrate in a thawing process of a frozen film.

DETAILED DESCRIPTION

Figure 1:
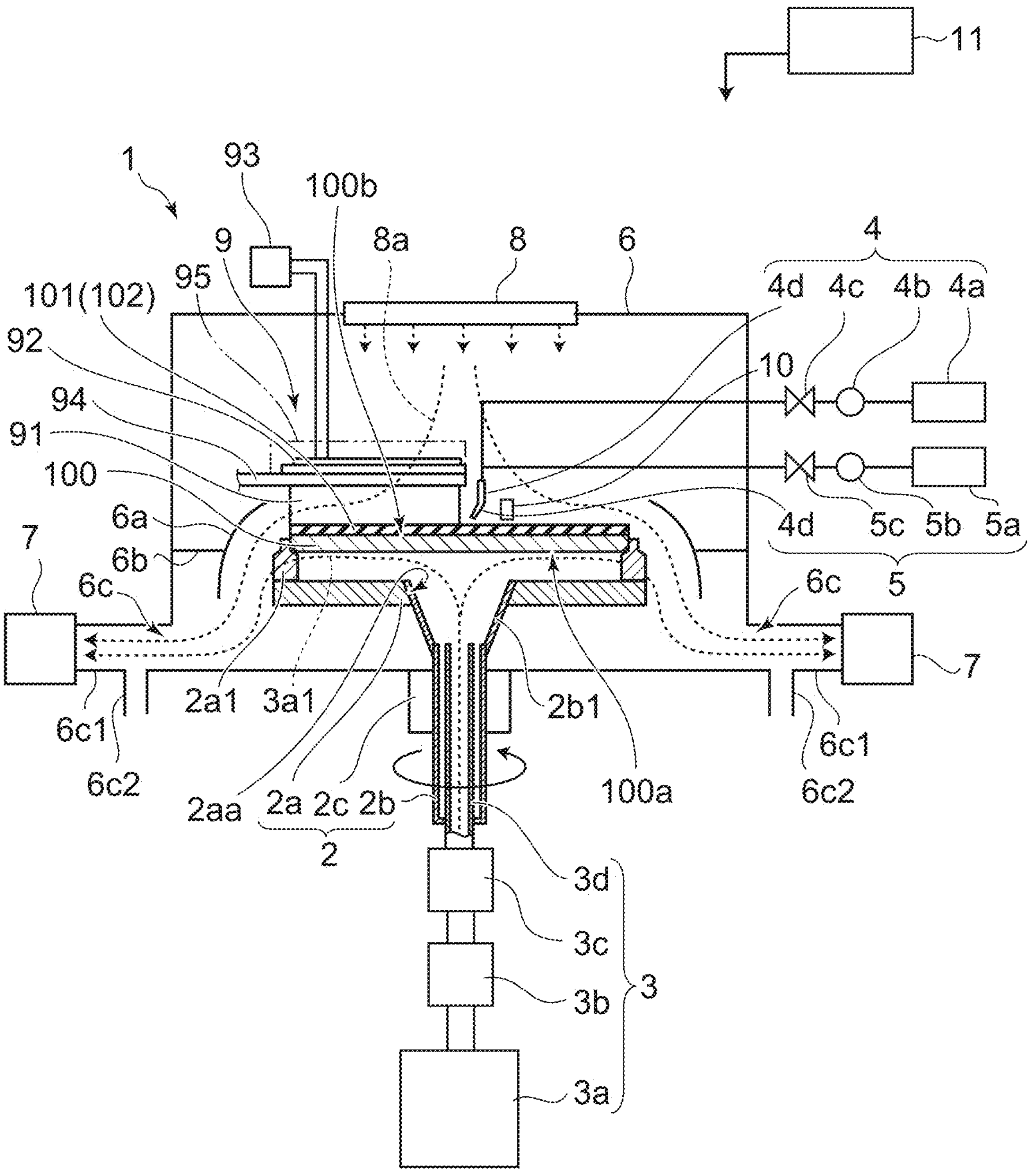
FIG. 1 is a schematic view illustrating a substrate treatment apparatus according to the embodiment.

A substrate treatment apparatus according to an embodiment removes foreign matter from a surface of a substrate by forming a frozen film at the surface of the substrate, incorporating, into the frozen film, the foreign matter adhered to the surface of the substrate, and thawing the frozen film including the foreign matter. A liquid supply part that supplies a liquid to the frozen film including the foreign matter, a vibrating part that faces the frozen film, and a controller that controls the vibrating part are included. The controller controls the vibrating part to transmit a vibration to a liquid film, which includes the liquid supplied to the frozen film and a liquid generated by the thawing of the frozen film, and to reduce an energy of the vibration transmitted to the liquid film or stop the vibration according to a position of an upper surface of the frozen film under the liquid film.

Embodiments will now be illustrated with reference to the drawings. Similar components in the drawings are marked with the same reference numerals; and a detailed description is omitted as appropriate.

Also, a substrate 100 illustrated below can be, for example, a semiconductor wafer, an imprint template, a photolithography mask, a plate-shaped body used in MEMS (Micro Electro Mechanical Systems), etc. The substrate 100 is not limited to the examples. It is sufficient for the substrate 100 to be a component in which a pattern (e.g., a fine uneven portion) is formed at a front surface 100*b*.

FIG. 1 is a schematic view illustrating a substrate treatment apparatus 1 according to the embodiment.

As shown in FIG. 1, the substrate treatment apparatus 1 includes, for example, a placement part 2, a cooling part 3, a first liquid supply part 4, a second liquid supply part 5, a chamber 6, an exhaust part 7, a blower 8, a vibrating part 9, a detecting part 10, and a controller 11.

The placement part 2 rotates the substrate 100 that is placed. The placement part 2 includes, for example, a placement platform 2*a*, a rotary shaft 2*b*, and a driver 2*c*.

The placement platform 2*a* is rotatably disposed inside the chamber 6. The placement platform 2*a* is plate-shaped. Multiple supporters 2*a*1 that support the substrate 100 are located at one major surface of the placement platform 2*a*. When the substrate 100 is supported by the multiple supporters 2*a*1, the front surface 100*b* of the substrate 100 (the surface at the side to be cleaned) faces away from the placement platform 2*a* side.

Also, a hole 2*aa* that extends through the placement platform 2*a* in the thickness direction is located at the central portion of the placement platform 2*a*.

One end portion of the rotary shaft 2*b* is located at the inner wall of the hole 2*aa* of the placement platform 2*a*. The other end portion of the rotary shaft 2*b* is located outside the chamber 6. The rotary shaft 2*b* is connected with the driver 2*c* outside the chamber 6.

The rotary shaft 2*b* is tubular. An outlet 2*b*1 is located at the end portion of the rotary shaft 2*b* at the placement platform 2*a* side. The outlet 2*b*1 is open at the surface of the placement platform 2*a* at which the multiple supporters 2*a*1 are located. The end portion of the outlet 2*b*1 at the opening side is connected to the inner wall of the hole 2*aa*. The opening of the outlet 2*b*1 faces a back surface 100*a* of the substrate 100 placed on the placement platform 2*a*. The cross-sectional area of the outlet 2*b*1 in directions orthogonal to the central axis of the rotary shaft 2*b* increases toward the placement platform 2*a* side (the opening side).

By providing the outlet 2*b*1, a cooling gas 3*a*1 that is released can be supplied to a wider region of the back surface 100*a* of the substrate 100. Also, the release rate of the cooling gas 3*a*1 can be reduced. Therefore, partial cooling of the substrate 100 and an excessively high cooling rate of the substrate 100 can be suppressed, and difficulties when generating a supercooled state of a liquid 101 described below can be suppressed.

A cooling nozzle 3*d* is mounted to the end portion of the rotary shaft 2*b* at the side opposite to the placement platform 2*a* side. A rotary shaft seal (not illustrated) is located between the cooling nozzle 3*d* and the end portion of the rotary shaft 2*b* at the side opposite to the placement platform 2*a* side. Therefore, the end portion of the rotary shaft 2*b* at the side opposite to the placement platform 2*a* side is airtightly sealed.

The driver 2*c* is located outside the chamber 6. The driver 2*c* is connected with the rotary shaft 2*b*. The rotational force of the driver 2*c* is transmitted to the placement platform 2*a* via the rotary shaft 2*b*. Therefore, the placement platform 2*a* as well as the substrate 100 placed on the placement platform 2*a* can be rotated by the driver 2*c*.

Also, the driver 2*c* not only can start the rotation and stop the rotation, but also can change the rotational speed (the speed of rotation). The driver 2*c* can include, for example, a control motor such as a servo motor, etc.

The cooling part 3 supplies the cooling gas 3*a*1 that cools the liquid 101 at the front surface 100*b* of the substrate 100. The cooling part 3 supplies the cooling gas 3*a*1 to the space between the placement platform 2*a* and the back surface 100*a* of the substrate 100. The cooling part 3 includes, for example, a cooling liquid part 3*a*, a filter 3*b*, a flow rate controller 3*c*, and a cooling nozzle 3*d*. The cooling liquid part 3*a*, the filter 3*b*, and the flow rate controller 3*c* are located outside the chamber 6.

The cooling liquid part 3*a* stores a cooling liquid and generates the cooling gas 3*a*1. The cooling liquid is the liquefied cooling gas 3*a*1. The cooling gas 3*a*1 is not particularly limited as long as the cooling gas 3*a*1 is a gas that does not easily react with the material of the substrate 100. The cooling gas 3*a*1 can be, for example, an inert gas such as nitrogen gas, helium gas, argon gas, etc.

The cooling liquid part 3*a* includes a tank that stores the cooling liquid, and a vaporizer that vaporizes the cooling liquid stored in the tank. A cooling apparatus that maintains the temperature of the cooling liquid is located in the tank. The vaporizer generates the cooling gas 3*a*1 from the cooling liquid by increasing the temperature of the cooling liquid. For example, the vaporizer can utilize the outside air temperature or can use heat from a heating medium. It is sufficient for the temperature of the cooling gas 3*a*1 to be not more than the freezing point of the liquid 101; for example, the temperature of the cooling gas 3*a*1 can be −170° C.

The cooling gas 3*a*1 also can be generated by using a chiller or the like to cool an inert gas such as nitrogen gas, etc. Thus, the cooling liquid part can be simplified.

The filter 3*b* is connected to the cooling liquid part 3*a* via a pipe. The filter 3*b* suppresses the flow toward the substrate 100 side of foreign matter such as particles, etc., included in the cooling liquid.

The flow rate controller 3*c* is connected to the filter 3*b* via a pipe. The flow rate controller 3*c* controls the flow rate of the cooling gas 3*a*1. The flow rate controller 3*c* can be, for example, a MFC (Mass Flow Controller), etc. Also, the flow rate controller 3*c* may indirectly control the flow rate of the cooling gas 3*a*1 by controlling the supply pressure of the cooling gas 3*a*1. In such a case, the flow rate controller 3*c* can be, for example, an APC (Auto Pressure Controller), etc.

The temperature of the cooling gas 3*a*1 generated from the cooling liquid in the cooling liquid part 3*a* is a substantially prescribed temperature. Therefore, the flow rate controller 3*c* can control the temperature of the substrate 100 as well as the temperature of the liquid 101 at the front surface 100*b* of the substrate 100 by controlling the flow rate of the cooling gas 3*a*1. In such a case, the liquid 101 can be set to a supercooled state in a cooling process described below by the flow rate controller 3*c* controlling the flow rate of the cooling gas 3*a*1.

The cooling nozzle 3*d* is tubular. One end portion of the cooling nozzle 3*d* is connected to the flow rate controller 3*c*. The other end portion of the cooling nozzle 3*d* is located inside the rotary shaft 2*b*. The other end portion of the cooling nozzle 3*d* is positioned at the vicinity of the end portion of the outlet 2*b*1 at the side opposite to the placement platform 2*a* side (the opening side).

The cooling gas 3*a*1 of which the flow rate is controlled by the flow rate controller 3*c* is supplied to the substrate 100 by the cooling nozzle 3*d*. The cooling gas 3*a*1 that is released from the cooling nozzle 3*d* is directly supplied to the back surface 100*a* of the substrate 100 via the outlet 2*b*1.

When the cooling gas 3*a*1 is supplied to the back surface 100*a* side of the substrate 100, the freezing starts from the back surface (the surface at the substrate 100 side) of the film of the liquid 101 formed at the front surface 100*b* of the substrate 100. When the freezing starts from the back surface of the film of the liquid 101, the foreign matter that is adhered to the front surface 100*b* of the substrate 100 is easily detached from the front surface 100*b* of the substrate 100.

It is therefore sufficient for the substrate treatment apparatus 1 to supply the cooling gas 3*a*1 at least to the back surface 100*a* side of the substrate 100. For example, the substrate treatment apparatus 1 also may supply the cooling gas 3*a*1 to the front surface 100*b* side of the substrate 100. When the cooling gas 3*a*1 also is supplied to the front surface 100*b* side of the substrate 100, it is sufficient to provide the cooling nozzle 3*d* also at the front surface 100*b* side of the substrate 100.

The first liquid supply part 4 supplies the liquid 101 to the front surface 100*b* of the substrate 100. The liquid 101 is used in a preliminary process described below and in the formation process of the film of the liquid 101. The liquid 101 is not particularly limited as long as the liquid 101 does not easily react with the material of the substrate 100. For example, the liquid 101 can be water (e.g., purified water, ultrapure water, etc.), a liquid that includes water as a major component, a liquid in which gas is dissolved, etc.

The first liquid supply part 4 includes, for example, a liquid container 4*a*, a supply part 4*b*, a flow rate controller 4*c*, and a liquid nozzle 4*d*. The liquid container 4*a*, the supply part 4*b*, and the flow rate controller 4*c* are located outside the chamber 6.

The liquid container 4*a* stores the liquid 101. The temperature of the liquid 101 stored in the liquid container 4*a* is greater than the freezing point of the liquid 101. The temperature of the liquid 101 stored in the liquid container 4*a* is, for example, room temperature (e.g., 20° C.).

The supply part 4*b* is connected to the liquid container 4*a* via a pipe. The supply part 4*b* supplies the liquid 101 stored in the liquid container 4*a* toward the liquid nozzle 4*d*. The supply part 4*b* can be, for example, a pump that is resistant to the liquid 101, etc.

The flow rate controller 4*c* is connected to the supply part 4*b* via a pipe. The flow rate controller 4*c* controls the flow rate of the liquid 101 supplied by the supply part 4*b*. The flow rate controller 4*c* can be, for example, a flow rate control valve. Also, the flow rate controller 4*c* can start the supply and stop the supply of the liquid 101.

The liquid nozzle 4*d* is located inside the chamber 6. The liquid nozzle 4*d* is tubular. One end portion of the liquid nozzle 4*d* is connected to the flow rate controller 4*c* via a pipe.

The other end portion of the liquid nozzle 4*d* (the discharge side of the liquid 101) is located above the front surface 100*b* of the substrate 100 placed on the placement platform 2*a*. The liquid 101 that is discharged from the liquid nozzle 4*d* is supplied to the front surface 100*b* of the substrate 100. The other end portion of the liquid nozzle 4*d* can be located at the vicinity of the rotation center of the substrate 100. Thus, the liquid 101 can be supplied to substantially the center of the front surface 100*b* of the substrate 100. The liquid 101 that is supplied to substantially the center of the front surface 100*b* of the substrate 100 spreads to the perimeter edge vicinity of the front surface 100*b* of the substrate 100; and a film of the liquid 101 having a substantially constant thickness is formed at the front surface 100*b* of the substrate 100.

Also, as shown in FIG. 1, the opening (the discharge port) of the other end portion of the liquid nozzle 4*d* also can face the side surface of a vibrating body 91 (a main body 91*a*) described below at the rotation center vicinity of the substrate 100. Thus, the liquid 101 that is discharged from the liquid nozzle 4*d* is supplied to the front surface 100*b* of the substrate 100 after striking the side surface of the vibrating body 91 (the main body 91*a*) at the rotation center vicinity of the substrate 100. Therefore, the liquid 101 can be supplied to a wider region of the front surface 100*b* of the substrate 100, and the impact velocity of the liquid 101 and the substrate 100 can be reduced. As a result, the film of the liquid 101 is easily formed over the entire front surface 100*b* of the substrate 100.

Also, a hole may be provided in the vibrating body 91 (the main body 91*a*); and the liquid 101 also can be supplied to the front surface 100*b* of the substrate 100 via the hole of the vibrating body 91 (the main body 91*a*). In other words, the vibrating body 91 also can have the function of the liquid nozzle 4*d*.

The second liquid supply part 5 supplies a liquid 102 to a frozen film 101*a* including foreign matter 300 in a thawing process described below. It is sufficient that the liquid 102 does not easily react with the material of the substrate 100 and does not easily remain at the front surface 100*b* of the substrate 100 in a drying process described below. Similarly to the liquid 101 described above, the liquid 102 can be, for example, water (e.g., purified water, ultrapure water, etc.), a liquid including water as a major component, a liquid in which a gas is dissolved, etc.

In the specification, the film of the liquid 101 that is formed at the front surface 100*b* of the substrate 100 and is completely frozen in a freezing process (a solid-liquid phase) described below is called the frozen film 101*a*.

In such a case, the liquid 102 may be the same as the liquid 101 or may be different from the liquid 101. When the liquid 102 is the same as the liquid 101, the second liquid supply part 5 can be omitted. When the second liquid supply part 5 is omitted, the first liquid supply part 4 is used in the thawing process described below as well. That is, the liquid 101 is used in the thawing process as well.

Also, the temperature of the liquid 102 can be set to be greater than the freezing point of the liquid 102. For example, it is sufficient for the temperature of the liquid 102 to be a temperature at which the frozen liquid 101 can be thawed. The temperature of the liquid 102 is, for example, about room temperature (e.g., 20° C.). Also, the thawing time can be reduced by setting the temperature of the liquid 102 to be greater than room temperature. When the temperature of the liquid 102 is set to be greater than room temperature, for example, a heater and a temperature control apparatus are included in a liquid container 5*a* described below.

In the thawing process as well, when the liquid 101 is used and the temperature of the liquid 101 is set to be greater than room temperature, the temperature of the film of the liquid 101 formed before a cooling process described below is high. When the temperature of the film of the liquid 101 is high, the duration of the cooling process increases. Therefore, when the temperature of the liquid used in the thawing process is set to be greater than room temperature, it is favorable to include the second liquid supply part 5 even when the liquid 102 is the same as the liquid 101.

The second liquid supply part 5 includes, for example, the liquid container 5*a*, a supply part 5*b*, a flow rate controller 5*c*, and the liquid nozzle 4*d*.

The liquid container 5*a* can be similar to the liquid container 4*a* described above. The supply part 5*b* can be similar to the supply part 4*b* described above. The flow rate controller 5*c* can be similar to the flow rate controller 4*c* described above.

FIG. 1 illustrates a case where the first liquid supply part 4 and the second liquid supply part 5 both use the nozzle 4*d*. However, a liquid nozzle that supplies the liquid 101 and a liquid nozzle that supplies the liquid 102 can be provided separately.

A case will now be described where the liquid nozzle 4*d* is used for the supply of the liquids 101 and 102.

The chamber 6 is box-shaped. A cover 6*a* is located inside the chamber 6. The cover 6*a* catches the liquid 101 (the liquid 102) that is supplied to the substrate 100 and is discharged outside the substrate 100 by the rotation of the substrate 100. A divider 6*b* is located inside the chamber 6. The divider 6*b* is located between the outer surface of the cover 6*a* and the inner surface of the chamber 6.

Multiple outlets 6*c* are provided in the side surface of the chamber 6 at the bottom surface side. The cooling gas 3*a*1, the liquid 101, and the liquid 102 after use, and air 8*a* supplied by the blower 8 are discharged outside the chamber 6 from the outlet 6*c*. An exhaust pipe 6*c*1 is connected to the outlet 6*c*. Also, a discharge pipe 6*c*2 that discharges the liquids 101 and 102 is connected to the outlet 6*c*.

The exhaust part 7 is connected to the exhaust pipe 6c1. The exhaust part 7 exhausts the cooling gas 3a1 and the air 8a after use. The exhaust part 7 is, for example, a pump, a blower, etc.

The blower 8 is located at the ceiling surface of the chamber 6. As long as the blower 8 is at the ceiling side, the blower 8 also can be located at the side surface of the chamber 6. The blower 8 includes, for example, a filter and a blower such as a fan, etc. The filter is, for example, a HEPA filter (High Efficiency Particulate Air Filter), etc.

The vibrating part 9 is used in the thawing process described below. In the thawing process, the vibrating part 9 transmits a vibration to a liquid film 103, which includes the liquid 102 (the liquid 101) supplied to the frozen film 101a and a liquid (the liquid 101) generated by thawing the frozen film 101a. For example, the vibrating part 9 transmits the vibration to the liquid film 103 from a direction crossing the front surface 100b of the substrate 100.

The vibrating part 9 includes, for example, the vibrating body 91, a transducer 92, a circuit 93, a holder 94, and a cover 95.

Figure 2:
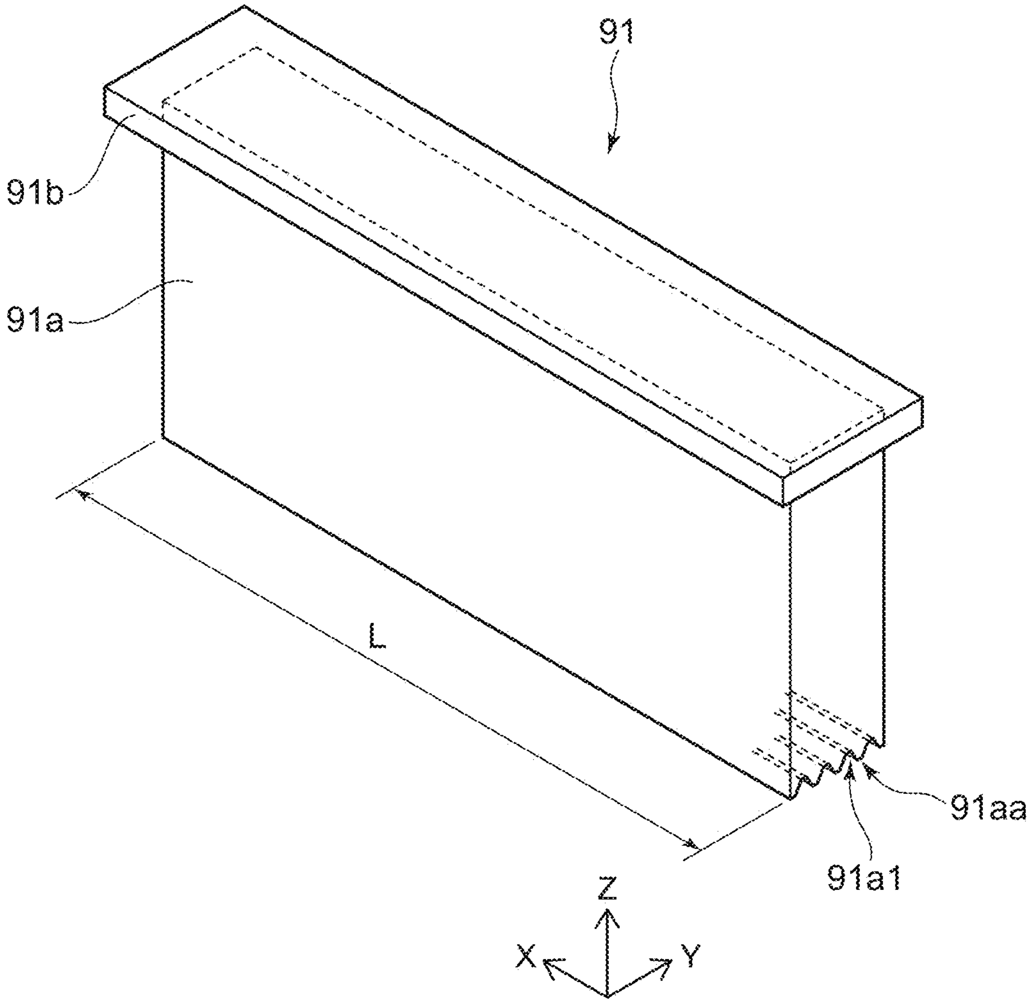
FIG. 2 is a schematic perspective view of a vibrating body.

FIG. 2 is a schematic perspective view of the vibrating body 91.

Arrows X, Y, and Z in FIG. 2 illustrate three mutually-orthogonal directions. The X-direction is one horizontal direction; and the Y-direction is one horizontal direction orthogonal to the X-direction.

As shown in FIG. 2, the vibrating body 91 includes, for example, the main body 91a and a flange 91b. The main body 91a and the flange 91b are formed as one piece. The vibrating body 91 is formed from a material through which the vibration from the transducer 92 easily propagates, and does not generate particles easily. For example, the vibrating body 91 is formed from quartz.

The main body 91a has, for example, a rectangular parallelepiped shape. A dimension L of the main body 91a in the X-direction can be greater than the maximum dimension between the rotation center of the substrate 100 and the perimeter edge of the substrate 100. For example, when the planar shape of the substrate 100 is a circle, the dimension L of the main body 91a can be greater than the radius of the substrate 100. For example, when the planar shape of the substrate 100 is quadrilateral, the dimension L of the main body 91a can be greater than half of the diagonal dimension of the substrate 100.

The substrate 100 rotates in the thawing process described below. Therefore, if the dimension L of the main body 91a is greater than the maximum dimension between the rotation center of the substrate 100 and the perimeter edge of the substrate 100, the vibration can be transmitted to the entire region of the liquid film 103 while the thawing process is being performed without moving the vibrating body 91.

An end portion 91aa of the main body 91a at the substrate 100 side can be a flat surface, or a groove 91a1 can be provided in the end portion 91aa as shown in FIG. 2. The groove 91a1 is open at the end portion 91aa of the main body 91a. At least one groove 91a1 can be provided. The groove 91a1 extends in the X-direction. The groove 91a1 is open at the two side surfaces of the main body 91a in the X-direction. When multiple grooves 91a1 are provided, the multiple grooves 91a1 can be arranged in the Y-direction.

The operations and effects of the groove 91a1 are described below.

The flange 91b is plate-shaped, and is located at the side opposite to the end portion 91aa side of the main body 91a. The flange 91b protrudes from the side surface of the main body 91a. The flange 91b can contact the upper surface of the holder 94. The flange 91b can be omitted. However, by including the flange 91b, the positioning of the vibrating body 91 and the stability of the orientation of the vibrating body 91 when mounting the vibrating body 91 to the holder 94 is easier.

Operations and effects of the groove 91a1 of the vibrating body 91 will now be described.

Figure 3:
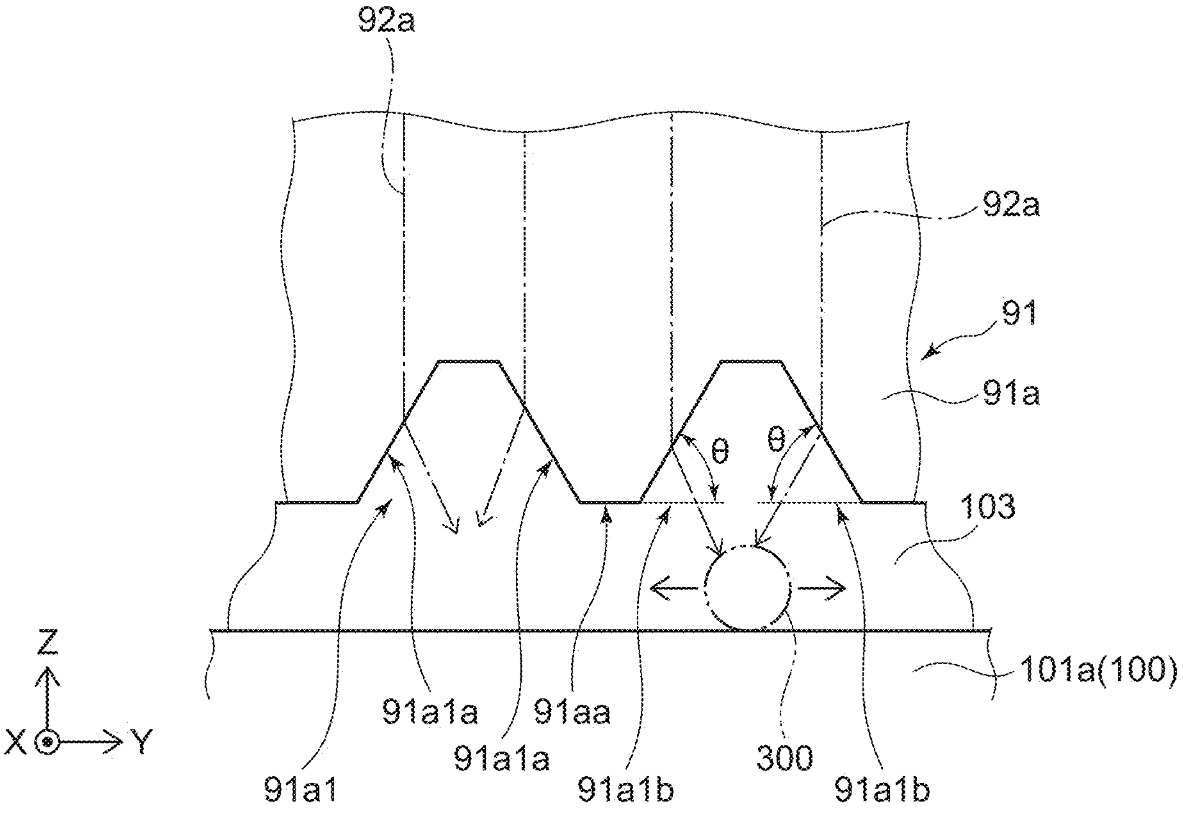
FIG. 3 is a schematic view illustrating operations and effects of a groove.

FIG. 3 is a schematic view illustrating operations and effects of the groove 91a1.

Arrows X, Y, and Z in FIG. 3 are similar to those of FIG. 2.

As shown in FIG. 3, a side surface 91a1a of the groove 91a1 in the Y-direction is inclined with respect to the end portion 91aa. Also, one side surface 91a1a is inclined in the opposite direction of the side surface 91a1a facing the one side surface 91a1a.

As shown in FIG. 3, a vibration 92a from the transducer 92 propagates through the vibrating body 91 (the main body 91a) and is incident on the side surface 91a1a of the groove 91a1. The propagation direction into the liquid film 103 of the vibration 92a that is incident on the side surface 91a1a changes according to the incline angle of the side surface 91a1a.

Here, when the end portion 91aa of the vibrating body 91 is a flat surface, the propagation direction of the vibration 92a into the liquid film 103 is substantially perpendicular to the front surface 100b of the substrate 100. Therefore, the direction of the force acting on the foreign matter 300 is substantially perpendicular to the upper surface of the frozen film 101a or the front surface 100b of the substrate 100, and so it is difficult for the foreign matter 300 to move in a direction parallel to the upper surface of the frozen film 101a or the front surface 100b of the substrate 100. When it is difficult for the foreign matter 300 to move in a direction parallel to the upper surface of the frozen film 101a or the front surface 100b of the substrate 100, it is difficult to detach and/or discharge the foreign matter 300.

In contrast, when the groove 91a1 is provided in the end portion 91aa of the vibrating body 91, as shown in FIG. 3, the direction of the force acting on the foreign matter 300 easily becomes a direction inclined with respect to the upper surface of the frozen film 101a or the front surface 100b of the substrate 100. If a force in a direction that is inclined with respect to the upper surface of the frozen film 101a or the front surface 100b of the substrate 100 is applied to the foreign matter 300, the force components in directions parallel to the upper surface of the frozen film 101a or the front surface 100b of the substrate 100 act on the foreign matter 300. Therefore, the foreign matter 300 easily moves in directions parallel to the upper surface of the frozen film 101a or the front surface 100b of the substrate 100. When the foreign matter 300 easily moves in directions parallel to the upper surface of the frozen film 101a or the front surface 100b of the substrate 100, the removal rate of the foreign matter 300 can be improved.

In such a case, it is favorable for an angle θ between the side surface of the groove 91a1 and an extension line 91a1b of the end portion 91aa of the vibrating body 91 to be 20°≥θ≤87°. Thus, it is even easier to move the foreign matter 300, and so the removal rate of the foreign matter 300 can be further improved.

Although FIG. 3 illustrates a case where the contour of the cross section of the groove 91a1 is trapezoidal, the contour of the cross section of the groove 91a1 may be, for example, triangular. Also, the side surface of the groove 91a1 may be a plane, or may be a curved surface. When the side surface of the groove 91a1 is a curved surface, it is sufficient for the angle between the tangent of the curved surface and the extension line of the end portion 91*aa* of the vibrating body 91 to be the angle θ described above.

Returning now to FIG. 1, the transducer 92, the circuit 93, the holder 94, and the cover 95 included in the vibrating part 9 will be described.

The transducer 92 is located on the vibrating body 91 (the flange 91*b*). For example, the transducer 92 can be bonded to the vibrating body 91. The transducer 92 converts an applied voltage into a force. The transducer 92 is, for example, a piezoelectric element, etc.

The circuit 93 is electrically connected with the transducer 92. The circuit 93 applies a voltage of a prescribed frequency to the transducer 92. In such a case, the frequency is, for example, about 1.6 MHz to 4 MHZ. Also, the circuit 93 can control the energy of the vibration and/or control the starting and stopping of the vibration. For example, the circuit 93 controls the energy of the vibration by changing at least one of the amplitude or the angular frequency.

The holder 94 holds the vibrating body 91 at a prescribed position above the substrate 100. In such a case, it is favorable to set the distance between the end portion 91*aa* of the vibrating body 91 (the main body 91*a*) and the front surface 100*b* of the substrate 100 to be not more than 1.8 mm. Thus, it is easier for the liquid film 103 to be held between the end portion 91*aa* of the vibrating body 91 (the main body 91*a*) and the front surface 100*b* of the substrate 100. Therefore, the vibration can be efficiently transmitted from the vibrating body 91 (the main body 91*a*) to the liquid film 103.

For example, the holder 94 has a plate shape and has a hole extending through in the thickness direction. The main body 91*a* of the vibrating body 91 can be inserted into the hole. When inserting the main body 91*a* into the hole, the flange 91*b* of the vibrating body 91 can be caused to contact the upper surface of the holder 94. The flange 91*b* can be mounted to the holder 94 by using a fastening member such as a screw, etc.

Also, the holder 94 can be movable in a direction parallel to the front surface 100*b* of the substrate 100. For example, a rotation axis may be located at the vicinity of the end portion of the holder 94 at the side opposite to the side at which the vibrating body 91 is located; and the holder 94 that holds the vibrating body 91 can be swiveled. For example, the holder 94 can be swiveled so that the vibrating body 91 is positioned above the front surface 100*b* of the substrate 100 in the thawing process described below; and the holder 94 can be swiveled so that the vibrating body 91 moves to a withdrawn position outside the substrate 100 in the other processes.

Therefore, the vibrating part 9 (the vibrating body 91) faces the frozen film 101*a* in the thawing process described below.

The cover 95 is located at the upper surface of the holder 94. The cover 95 covers the transducer 92. The cover 95 can be mounted to the holder 94 by using a fastening member such as a screw, etc.

The detecting part 10 detects the thawing status (the melting status) of the frozen film 101*a* in the thawing process described below. In the thawing process, when the frozen film 101*a* starts to thaw, the liquid film 103 described above is formed on the remaining frozen film 101*a* that still has not thawed. Therefore, the thawing status can be detected by detecting the position of the upper surface of the remaining frozen film 101*a* (the position of the interface between the liquid film 103 and the frozen film 101*a*).

For example, the detecting part 10 can be a reflection-type optical sensor. In such a case, the detecting part 10 irradiates light on the liquid film 103 and receives light reflected by the interface between the liquid film 103 and the frozen film 101*a*. Then, the detecting part 10 detects the position of the interface based on the received reflected light. If the detecting part 10 is a reflection-type optical sensor, the position of the upper surface of the frozen film 101*a* can be directly detected.

Also, the detecting part 10 may indirectly detect the position of the upper surface of the frozen film 101*a*.

For example, when the frozen film 101*a* is formed by completely freezing the film of the liquid 101 in the freezing process described below, the thickness of the frozen film 101*a* exceeds the thickness of the film of the liquid 101 before freezing due to volume expansion. Then, when the frozen film 101*a* is thawed in the thawing process, the thickness of the frozen film 101*a* gradually decreases. The thickness of the film of the liquid 101 generated by the frozen film 101*a* thawing is less than the thickness of the frozen film 101*a* that was thawed. Therefore, the total thickness of the remaining frozen film 101*a* and the liquid film 103 on the frozen film 101*a* gradually decreases as the frozen film 101*a* thaws.

Therefore, the position of the upper surface of the frozen film 101*a* under the liquid film 103 can be determined by detecting the position of the upper surface of the liquid film 103. The relationship between the position of the upper surface of the liquid film 103 and the position of the upper surface of the frozen film 101*a* under the liquid film 103 can be determined by performing experiments and/or simulations beforehand.

When detecting the position of the upper surface of the liquid film 103, the detecting part 10 can be, for example, a non-contact displacement meter such as a laser displacement meter, an ultrasonic displacement meter, etc.

Also, the position of the upper surface of the frozen film 101*a* under the liquid film 103 also can be indirectly detected by detecting the temperature of the upper surface of the liquid film 103.

For example, in the thawing process, the volume of the liquid film 103 on the frozen film 101*a* increases as the frozen film 101*a* thaws. Because the temperature of the liquid film 103 is greater than the temperature of the frozen film 101*a*, the temperature of the upper surface of the liquid film 103 increases as the volume of the liquid film 103 increases (as the thawing proceeds). Therefore, the position of the upper surface of the frozen film 101*a* under the liquid film 103 can be indirectly detected by detecting the temperature of the upper surface of the liquid film 103. The relationship between the temperature of the upper surface of the liquid film 103 and the position of the upper surface of the frozen film 101*a* under the liquid film 103 can be determined by performing experiments and/or simulations beforehand.

When the temperature of the upper surface of the liquid film 103 is detected, the detecting part 10 can be, for example, a non-contact thermometer such as a radiation thermometer, thermography, etc.

Also, the position of the upper surface of the frozen film 101*a* under the liquid film 103 can be determined based on the time from the start of the thawing.

For example, the temperature of the liquid 101 (the liquid 102) used in the thawing process is set within a prescribed range; and the relationship between the time from the start of the thawing (e.g., the start of the supply of the liquid 101 (the liquid 102)) and the position of the upper surface of the frozen film 101*a* under the liquid film 103 is determined by performing experiments and/or simulations beforehand. Thus, the position of the upper surface of the frozen film 101*a* under the liquid film 103 can be indirectly detected based on the time from the start of the thawing (e.g., the time from starting the supply of the liquid 102 by the second liquid supply part 5).

The detecting part 10 can be omitted if the position of the upper surface of the frozen film 101*a* is determined by time management. If the detecting part 10 can be omitted, the configuration of the substrate treatment apparatus 1 can be simplified, and/or the manufacturing cost can be reduced.

However, by detecting the position of the upper surface of the frozen film 101*a* with the detecting part 10, the position of the upper surface of the frozen film 101*a* can be determined more accurately.

Details related to the purpose and effects of detecting the position of the upper surface of the frozen film 101*a* in the thawing process are described below.

The controller 11 controls the operations of the components included in the substrate treatment apparatus 1. The controller 11 includes, for example, a calculation part such as a CPU (Central Processing Unit) or the like, a storage part such as semiconductor memory, etc. The controller 11 is, for example, a computer. A control program that controls the operations of the components included in the substrate treatment apparatus 1 is stored in the storage part. The calculation part sequentially performs a preliminary process, a formation process of the film of the liquid 101, a cooling process, a thawing process, and a drying process described below based on the control program stored in the storage part.

Figure 4:
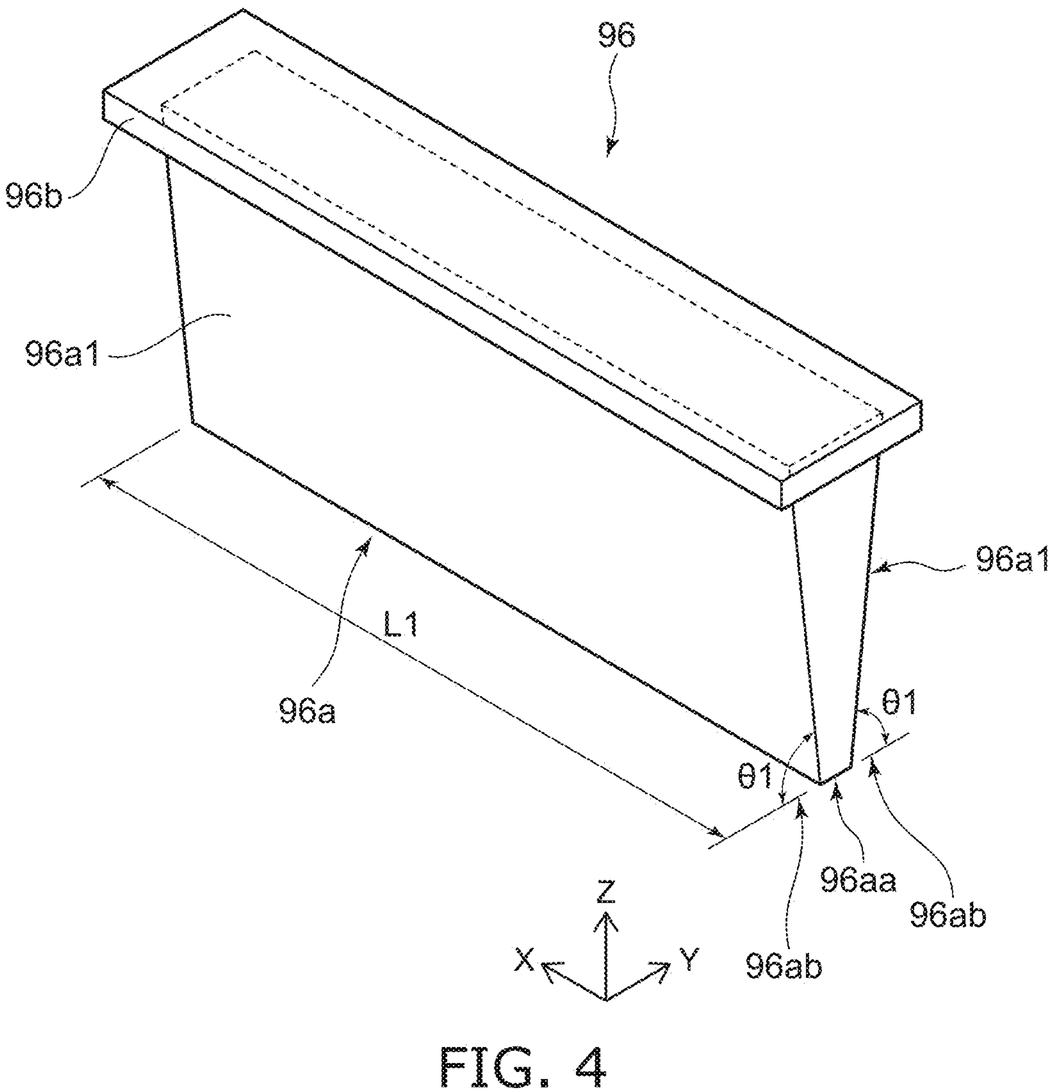
FIG. 4 is a schematic perspective view of a vibrating body according to another embodiment.

FIG. 4 is a schematic perspective view of a vibrating body 96 according to another embodiment.

Arrows X, Y, and Z in FIG. 4 are similar to those of FIG. 2.

As shown in FIG. 4, the vibrating body 96 includes, for example, a main body 96*a* and a flange 96*b*. The main body 96*a* and the flange 96*b* are formed as one piece. The material of the vibrating body 96 can be, for example, similar to the material of the vibrating body 91 described above.

The flange 96*b* can be similar to the flange 91*b* described above.

A dimension L1 of the main body 96*a* in the X-direction can be similar to the dimension L of the main body 91*a* described above. A side surface 96*a*1 of the main body 96*a* in the Y-direction is connected to an end portion 96*aa* of the vibrating body 96 (the main body 96*a*). The side surface 96*a*1 is inclined with respect to the end portion 96*aa* of the vibrating body 96 (the main body 96*a*). An angle θ1 between the side surface 96*a*1 of the main body 96*a* and an extension line 96*ab* of the end portion 96*aa* of the vibrating body 96 (the main body 96*a*) can be similar to the angle θ described above.

Figure 5:
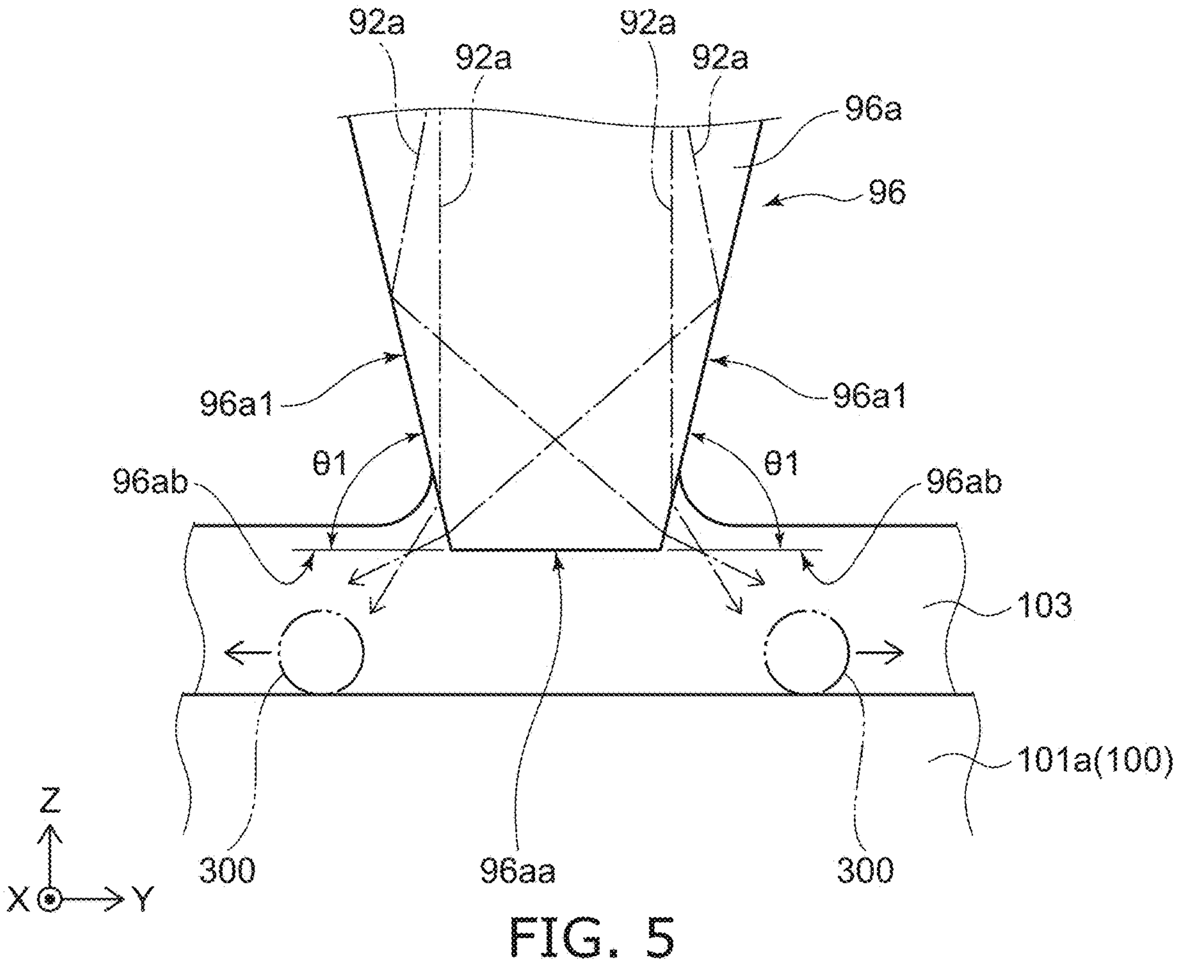
FIG. 5 is a schematic view illustrating operations and effects of the vibrating body.

FIG. 5 is a schematic view illustrating operations and effects of the vibrating body 96.

In the vibrating body 96 as shown in FIG. 5, the vibration 92*a* from the transducer 92 propagates through the vibrating body 96 (the main body 96*a*) and is incident on the side surface 96*a*1 of the main body 96*a*. Total reflections due to Snell's law tend to occur at the region of the side surface 96*a*1 not contacting the liquid film 103 (the region contacting outside air). Therefore, at the region of the side surface 96*a*1 not contacting the liquid film 103, the vibration 92*a* propagates while being repeatedly reflected. For example, in FIG. 5, the vibration 92*a* that is incident on the side surface 96*a*1 from the upper side in a direction oblique to the Z-direction is reflected once by the side surface 96*a*1. The vicinity of the end portion 96*aa* of the vibrating body 96 (the main body 96*a*) contacts the liquid film 103. For example, the vicinity of the end portion 96*aa* of the vibrating body 96 (the main body 96*a*) is inserted into the liquid film 103. The liquid film 103 contacts the vicinity of the end portion 96*aa* of the vibrating body 96 (the main body 96*a*) due to the surface tension of the liquid film 103 and/or the flowability of the liquid film 103 accompanying the rotation of the substrate 100. The vibration 92*a* that is incident on the portion of the side surface 96*a*1 contacting the liquid film 103 tends to be emitted from the vibrating body 96 (the main body 96*a*) due to Snell's law. In such a case, the propagation direction of the vibration 92*a* changes according to the angle θ1.

As shown in FIG. 5, there is also the vibration 92*a* that is incident on the side surface 96*a*1 from a direction substantially parallel to the Z-direction from the upper side and is emitted from the vibrating body 96 (the main body 96*a*) without being reflected on the side surface 96*a*1 even once.

In the vibrating body 96 as well, as shown in FIG. 5, the direction of the force acting on the foreign matter 300 tends to be a direction oblique to the upper surface of the frozen film 101*a* or the front surface 100*b* of the substrate 100. Therefore, as described with reference to FIG. 3, a force component in a direction parallel to the upper surface of the frozen film 101*a* or the front surface 100*b* of the substrate 100 acts on the foreign matter 300, and so the foreign matter 300 easily moves in the direction parallel to the upper surface of the frozen film 101*a* or the front surface 100*b* of the substrate 100. When the foreign matter 300 moves easily in a direction parallel to the upper surface of the frozen film 101*a* or the front surface 100*b* of the substrate 100, the removal rate of the foreign matter 300 can be improved.

Although the end portion 96*aa* of the vibrating body 96 (the main body 96*a*) illustrated in FIG. 5 is a flat surface, the groove 91*a*1 that includes the inclined surface described above also can be provided in the end portion 96*aa*. Also, the side surface of the vibrating body 91 (the main body 91*a*) described above can be an inclined surface.

Figure 6:
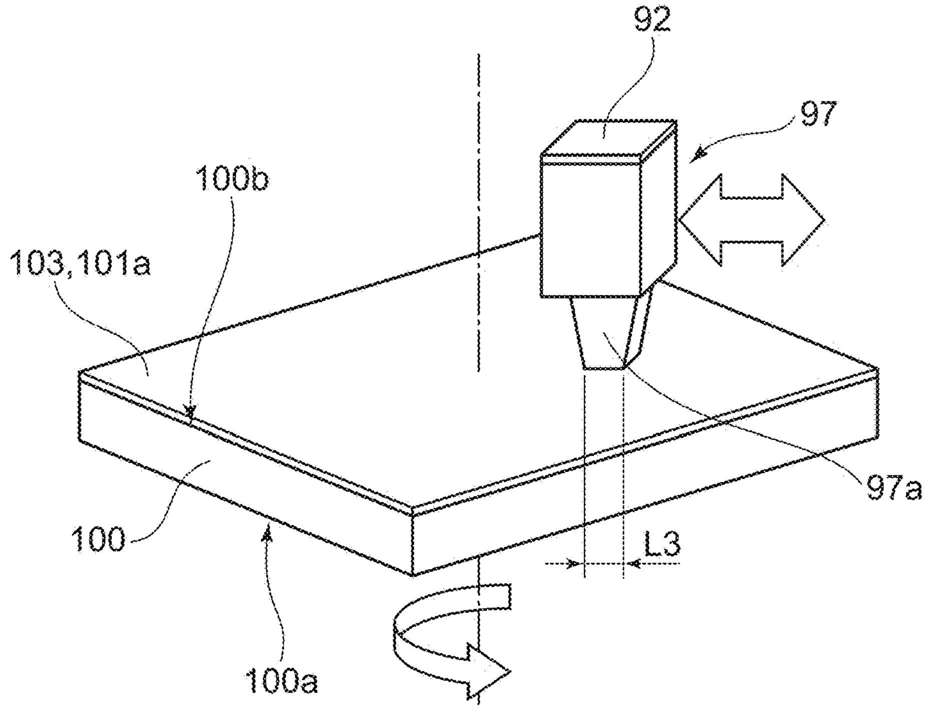
FIG. 6 is a schematic perspective view illustrating a vibrating body according to another embodiment.

FIG. 6 is a schematic perspective view illustrating a vibrating body 97 according to another embodiment.

As shown in FIG. 6, the vibrating body 97 includes a side surface 97*a* that is inclined with respect to the end portion of the vibrating body 97. For example, the vibrating body 97 can be a vibrating body in which the dimension L1 of the vibrating body 96 described above is reduced. The vibrating body 97 may be a vibrating body in which the dimension L of the vibrating body 91 described above is reduced. A dimension L3 of the vibrating body 97 can be less than the minimum dimension between the rotation center of the substrate 100 and the perimeter edge of the substrate 100. Thus, the vibrating body 97 can be smaller and/or less costly. If, however, the dimension L3 is reduced, the vibration is transmitted to a partial region of the liquid film 103. It is therefore necessary to move the position of the vibrating body 97 between the rotation center of the substrate 100 and the perimeter edge of the substrate 100. For example, it is sufficient to include a holder that can move the vibrating body 97 in a direction parallel to the front surface 100*b* of the substrate 100.

As described above, the substrate treatment apparatus 1 according to the embodiment forms the frozen film 101*a* at the front surface 100*b* of the substrate 100. Then, the foreign matter 300 that is adhered to the front surface 100*b* of the substrate 100 is incorporated into the frozen film 101*a*; the frozen film 101*a* that includes the foreign matter 300 is thawed; and the foreign matter 300 is removed from the front surface 100*b* of the substrate 100.

Operations of the substrate treatment apparatus 1 will now be described further.

Figure 7:
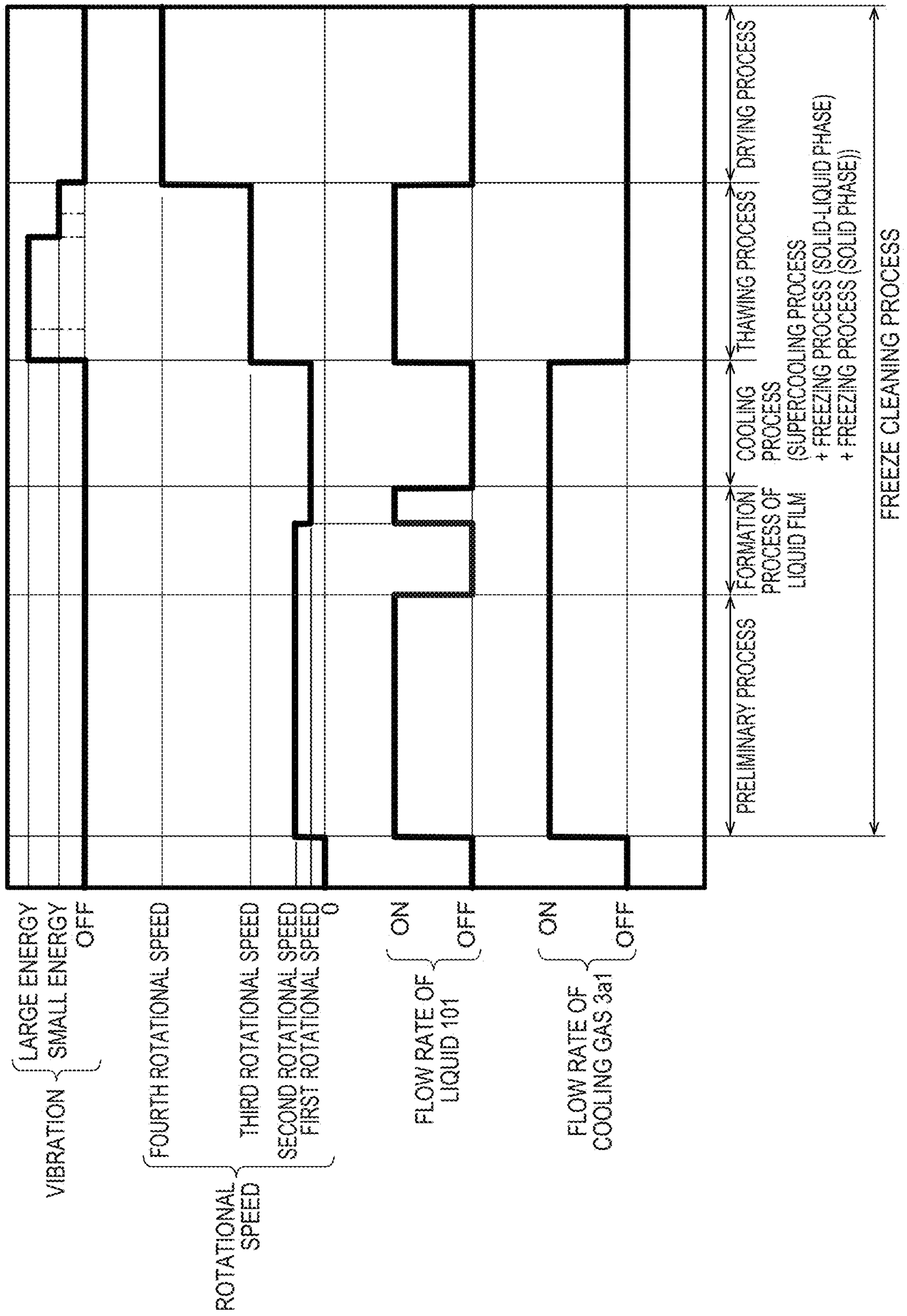
FIG. 7 is a timing chart illustrating operations of a substrate treatment apparatus.

FIG. 7 is a timing chart illustrating operations of the substrate treatment apparatus 1.

Figure 8:
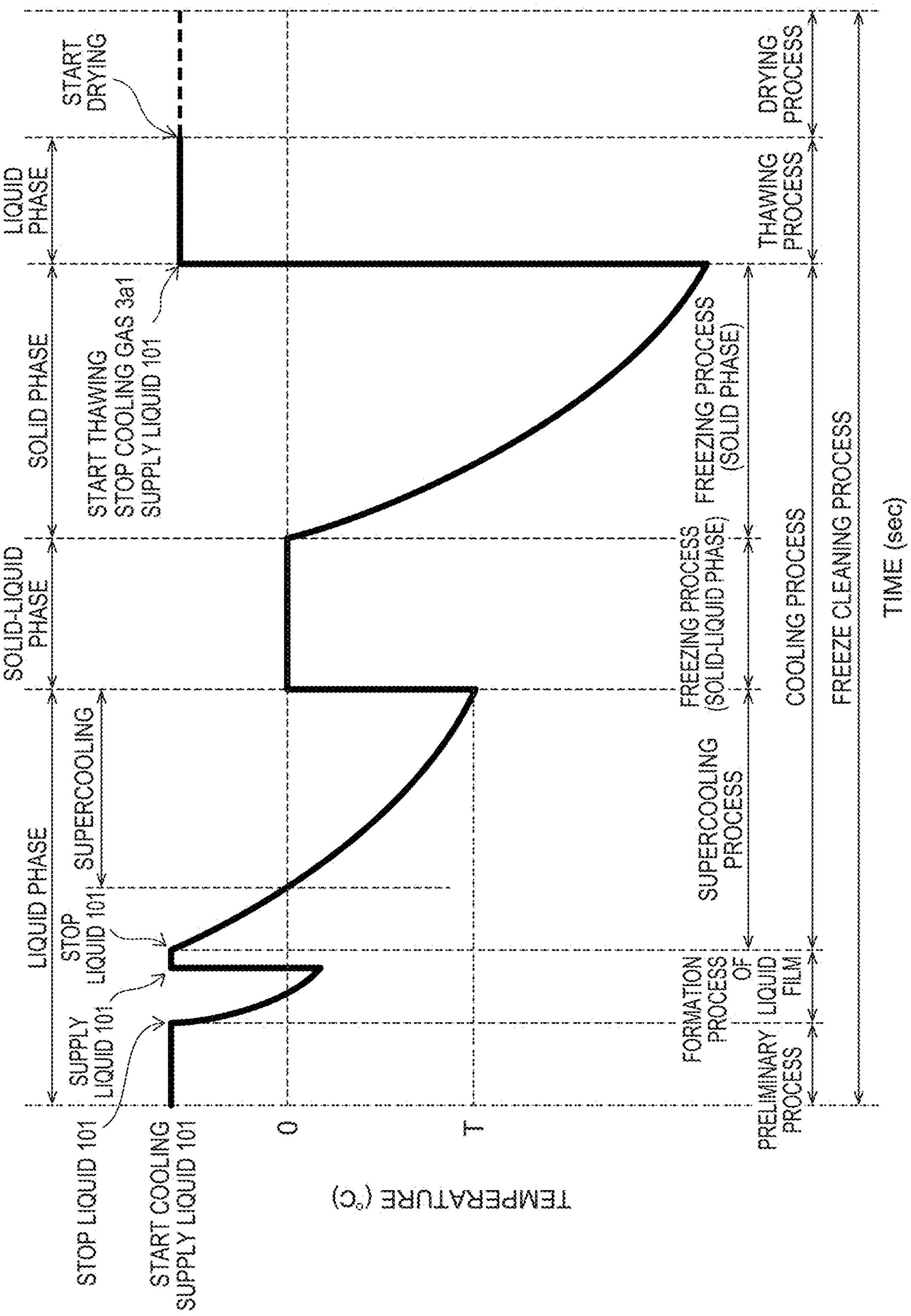
FIG. 8 is a graph illustrating a temperature change of a liquid supplied to a surface of a substrate.

FIG. 8 is a graph illustrating the temperature change of the liquid 101 supplied to the front surface 100*b* of the substrate 100.

FIGS. 7 and 8 illustrate a case where the substrate 100 is a 6025 quartz (Qz) substrate (152 mm×152 mm×6.35 mm), and the liquid 101 and the liquid 102 are purified water.

The liquid 102 that is used in the thawing is the same as the liquid 101. Therefore, in FIGS. 7 and 8, the liquid 101 is used in the thawing process as well.

First, the substrate 100 is transferred into the chamber 6 via a receive/dispatch port (not illustrated) of the chamber 6. The substrate 100 that is transferred is placed on and supported by the multiple supporters 2*a*1 of the placement platform 2*a*.

After the substrate 100 is supported by the placement platform 2*a*, the freeze cleaning process that includes the preliminary process, the formation process of the film of the liquid 101, the cooling process, the thawing process, and the drying process is performed as shown in FIGS. 7 and 8.

First, the preliminary process is performed as shown in FIGS. 7 and 8.

In the preliminary process, the controller 11 supplies a prescribed flow rate of the liquid 101 to the front surface 100*b* of the substrate 100 by controlling the supply part 4*b* and the flow rate controller 4*c*. Also, the controller 11 supplies a prescribed flow rate of the cooling gas 3*a*1 to the back surface 100*a* of the substrate 100 by controlling the flow rate controller 3*c*. Also, the controller 11 rotates the substrate 100 at a second rotational speed by controlling the driver 2*c*.

Here, when the atmosphere inside the chamber 6 is cooled by supplying the cooling gas 3*a*1, there is a risk that frost that includes dust from the atmosphere may adhere to the substrate 100 and cause contamination. Therefore, the liquid 101 is continuously supplied to the front surface 100*b* of the substrate 100 in the preliminary process. In other words, in the preliminary process, frost is prevented from adhering to the front surface 100*b* of the substrate 100 while the substrate 100 is being cooled.

The second rotational speed is, for example, about 50 rpm to 500 rpm. The flow rate of the liquid 101 is, for example, about 0.1 L/min to 1.0 L/min. The flow rate of the cooling gas 3*a*1 is, for example, about 40 NL/min to 200 NL/min. The process time of the preliminary process is about 1,800 seconds.

In the preliminary process, the temperature of the film of the liquid 101 is substantially equal to the temperature of the liquid 101 being supplied because the liquid 101 is being supplied continuously. For example, the temperature of the film of the liquid 101 is about room temperature (20° C.) when the temperature of the liquid 101 being supplied is about room temperature (20° C.).

Then, the formation process of the film of the liquid 101 is performed as shown in FIGS. 7 and 8.

In the formation process of the film of the liquid 101, the supply of the liquid 101 supplied in the preliminary process is stopped. The liquid 101 that is at the front surface 100*b* of the substrate 100 is discharged because the rotation of the substrate 100 is maintained. At this time, the rotational speed of the substrate 100 is decelerated to a first rotational speed at which fluctuation of the thickness of the film of the liquid

101 due to the centrifugal force can be suppressed. The first rotational speed is, for example, 0 rpm to 50 rpm.

After the rotational speed of the substrate 100 is set to the first rotational speed, the film of the liquid 101 is formed by supplying a prescribed amount of the liquid 101 to the substrate 100. The thickness of the film of the liquid 101 (the thickness of the film of the liquid 101 when performing the cooling process) is, for example, about 300 μm to 1,300 μm.

The flow rate of the cooling gas 3*a*1 during the formation process of the film of the liquid 101 is maintained at the same flow rate as the preliminary process. The in-plane temperature of the substrate 100 is substantially uniform in the preliminary process described above. In the formation process of the film of the liquid 101, the state in which the in-plane temperature of the substrate 100 is substantially uniform can be maintained by maintaining the flow rate of the cooling gas 3*a*1 at the same flow rate as the preliminary process.

Then, the cooling process is performed as shown in FIGS. 7 and 8.

In the specification, the cooling process includes a "supercooling process", a "freezing process (solid-liquid phase)", and a "freezing process (solid phase)". The "supercooling process" is a process in which the liquid 101 reaches a supercooled state until before the liquid 101 in the supercooled state starts to freeze. In the supercooling process, only the liquid 101 is present over the entire front surface 100*b* of the substrate 100. The "freezing process (solid-liquid phase)" is a process in which the freezing of the liquid 101 in the supercooled state starts until before the freezing completely finishes. In the freezing process (solid-liquid phase), the liquid 101 and the frozen liquid 101 are present over the entire front surface 100*b* of the substrate 100. The "freezing process (solid phase)" is a process after the liquid 101 has completely frozen. In the freezing process (solid phase), only the frozen film 101*a* in which the liquid 101 is frozen is present over the entire front surface 100*b* of the substrate 100.

There are also cases where the thawing process is performed before forming the frozen film 101*a* by performing the freezing process (solid-liquid phase) after the formation process of the film of the liquid 101 without performing the supercooling process. There are also cases where the freezing process (solid-liquid phase), the freezing process (solid phase), and the thawing process are sequentially performed after the formation process of the film of the liquid 101 without performing the supercooling process. In other words, there are cases where the supercooling process and the freezing process (solid phase) are omitted. Even when the supercooling process and the freezing process (solid phase) are omitted, the foreign matter 300 can be detached from the front surface 100*b* of the substrate 100. By omitting the supercooling process and the freezing process (solid phase), the cooling process can be simplified, and even the duration of the cooling process can be reduced.

In the supercooling process, the temperature of the film of the liquid 101 of the front surface 100*b* of the substrate 100 drops below the temperature of the film of the liquid 101 in the formation process of the film of the liquid 101 due to the cooling gas 3*a*1 continuously supplied to the back surface 100*a* of the substrate 100; and the film of the liquid 101 reaches a supercooled state. In such a case, when the cooling rate of the liquid 101 is too high, the liquid 101 may quickly freeze without reaching the supercooled state. Therefore, the controller 11 causes the liquid 101 at the front surface 100*b* of the substrate 100 to reach the supercooled state by controlling at least one of the rotational speed of the substrate 100, the flow rate of the cooling gas **3*a*1, or the flow rate of the liquid 101**.

The control conditions at which the liquid 101 reaches the supercooled state are affected by the size of the substrate 100, the viscosity of the liquid 101, the specific heat of the cooling gas **3*a*1, etc. It is therefore favorable to appropriately determine the control conditions at which the liquid 101** reaches the supercooled state by performing experiments and/or simulations beforehand.

As described above, there are also cases where the supercooling process is not performed. In such a case, the controller 11 increases the cooling rate of the liquid 101 by controlling at least one of the rotational speed of the substrate 100, the flow rate of the cooling gas **3*a*1, or the flow rate of the liquid 101. By increasing the cooling rate of the liquid 101**, the freezing process (solid-liquid phase) is performed without performing the supercooling process.

When the liquid 101 in the supercooled state starts to freeze, the supercooling process transitions to the freezing process (solid-liquid phase). In the supercooled state, for example, the freezing of the liquid 101 starts in response to the temperature of the film of the liquid 101, the foreign matter 300 such as particles or the like, the presence of bubbles, vibrations, etc. For example, when the foreign matter 300 such as particles or the like are present, the freezing of the liquid 101 starts when a temperature T of the liquid 101 is not less than −35° C. and not more than −20° C. Also, the freezing of the liquid 101 can be started by applying a vibration to the liquid 101 by causing the rotation of the substrate 100 to fluctuate, etc.

As described above, in the liquid 101 in the supercooled state, the foreign matter 300 forms some percentage of the starting points of the freezing. The foreign matter 300 that is a starting point of the freezing is more easily incorporated into the frozen film **101*a*. Therefore, the removal rate of the foreign matter 300 can be improved by performing the supercooling process. Also, it is considered that the foreign matter 300 adhered to the front surface 100*b* of the substrate 100 is detached by the pressure wave accompanying the volume change when the liquid 101** changes to a solid, the physical force accompanying the volume increase, etc.

Then, the thawing process is performed as shown in FIGS. 7 and 8.

For example, the start of the thawing process can be determined based on the start timing of the preliminary process and/or the elapsed time from the start timing of the freezing process (solid-liquid phase). Whether the thawing starts partway through the freezing process (solid-liquid phase) or the thawing starts partway through the freezing process (solid phase) is determined by the length of the elapsed time. The surface state of the liquid 101 (the frozen film **101*a*) at the front surface 100*b* side of the substrate 100** may be detected, and the timing of the thawing start may be determined based on the change of the surface state.

Also, in the thawing process, the vibration **92*a* is transmitted by the vibrating part 9 to the liquid film 103 including the liquid 101 (the liquid 102) supplied for thawing and the liquid 101 generated by the thawing of the frozen film 101*a***.

Details related to the thawing process are described below.

Then, the drying process is performed as shown in FIGS. 7 and 8.

In the drying process, the controller 11 stops the supply of the liquid 101 by controlling the supply part **4*b* and the flow rate controller 4*c*. When the liquid 101 and the liquid 102 are different liquids, the controller 11 stops the supply of the liquid 102 by controlling the supply part 5*b* and the flow rate controller 5*c***.

Also, the controller 11 stops the supply of the cooling gas **3*a*1 by controlling the flow rate controller 3*c***.

Also, the controller 11 stops the generation of the vibration **92*a* by controlling the circuit 93. Also, the controller 11 can move the vibrating body 91 (the vibrating body 96 and the vibrating body 97) to a withdrawn position outside the substrate 100 by controlling the holder 94**.

Also, the controller 11 sets the rotational speed of the substrate 100 to a fourth rotational speed that is faster than the rotational speed of the substrate 100 in the thawing process (a third rotational speed described below) by controlling the driver **2*c*. The drying time of the substrate 100 can be reduced by making the rotation of the substrate 100** faster. The fourth rotational speed is not particularly limited as long as drying can be performed.

Thus, the freeze cleaning process ends. The freeze cleaning process can be performed multiple times.

The substrate 100 for which the freeze cleaning process has ended is dispatched outside the chamber 6 via a receive/dispatch port (not illustrated) of the chamber 6.

The thawing process will now be described further.

In the thawing process, the controller 11 supplies the liquid 101 to the frozen film **101*a* by controlling the supply part 4*b* and the flow rate controller 4*c*. When the liquid 101 and the liquid 102 are different, the controller 11 supplies the liquid 102 to the frozen film 101*a* by controlling the supply part 5*b* and the flow rate controller 5*c***.

The flow rate of the liquid 101 or 102 is not particularly limited as long as the thawing can be performed. The temperature of the liquid 101 or 102 can be room temperature (e.g., 20° C.). As described above, the temperature of the liquid 101 can be set to room temperature (e.g., 20° C.), and the temperature of the liquid 102 used in the thawing can be set to a temperature that is greater than room temperature.

Also, the controller 11 increases the rotational speed of the substrate 100 from the first rotational speed to the third rotational speed by controlling the driver **2*c*. The third rotational speed is, for example, about 200 rpm to 700 rpm. By making the rotation of the substrate 100 faster, the liquid 101 and the frozen liquid 101 can be flung off by the centrifugal force. Therefore, the liquid 101 and the frozen liquid 101 are easily discharged from the front surface 100*b* of the substrate 100. At this time, the foreign matter 300 that is detached from the front surface 100*b* of the substrate 100 also is discharged together with the liquid 101 and the frozen liquid 101**.

Also, the controller 11 causes the transducer 92 to generate the vibration **92*a* by controlling the circuit 93. The generated vibration 92*a* is transmitted to the liquid film 103 via the vibrating body 91 (the vibrating body 96 and the vibrating body 97**).

As shown in FIG. 7, the timing of generating the vibration **92*a* may be simultaneous with the start of the supply of the liquid 101 (the liquid 102) used in the thawing, or may be after the start of the supply of the liquid 101 (the liquid 102) as illustrated by the single dot-dash line FIG. 7. The timing of stopping the vibration 92*a* may be simultaneous with the stop of the supply of the liquid 101 (the liquid 102) used in the thawing, or may be before the stop of the supply of the liquid 101 (the liquid 102) as illustrated by the single dot-dash line in FIG. 7**.

By transmitting the vibration **92*a* to the liquid film 103, re-adhesion to the front surface 100*b* of the substrate 100 of the foreign matter 300 detached from the front surface 100*b*** of the substrate 100, etc., can be suppressed. Therefore, the removal rate of the foreign matter 300 can be improved.

The purpose and effects of detecting the position of the upper surface of the frozen film 101*a* in the thawing process will now be described further.

As described above, by transmitting the vibration 92*a* to the liquid film 103, re-adhesion of the detached foreign matter 300, etc., can be suppressed. In such a case, the re-adhesion of the detached foreign matter 300, etc., can be more effectively suppressed by increasing the energy of the vibration 92*a*.

Figure 9A:
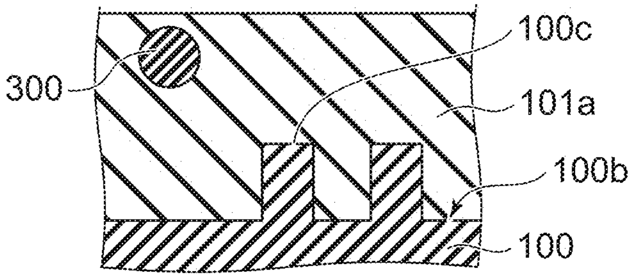
FIGS. 9A to 9C are schematic cross-sectional views of processes, illustrating a thawing process.
Figure 9B:
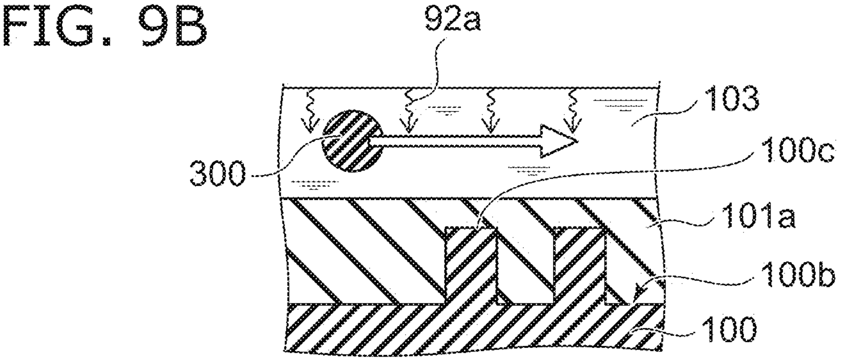
Figure 9C:
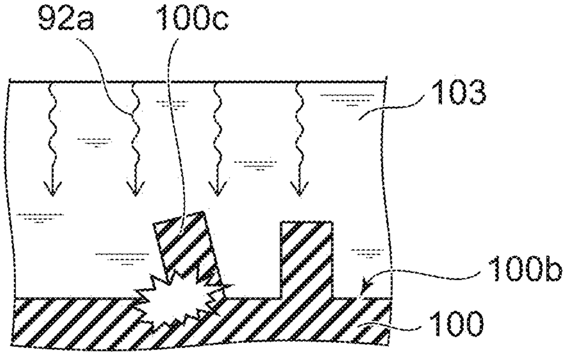

FIGS. 9A to 9C are schematic cross-sectional views of processes, illustrating the thawing process.

As shown in FIG. 9A, the foreign matter 300 that is detached from the front surface 100*b* of the substrate 100 is incorporated into the frozen film 101*a*.

When the thawing of the frozen film 101*a* is started as shown in FIG. 9B, the liquid film 103 is formed on the remaining frozen film 101*a* that still has not thawed. Also, the vibration 92*a* is transmitted to the liquid film 103. By transmitting the vibration 92*a* to the liquid film 103, the re-adhesion of the detached foreign matter 300, etc., can be suppressed.

However, a pattern 100*c* is formed at the front surface 100*b* of the substrate 100. The pattern 100*c* is, for example, a fine uneven portion, etc. Therefore, as shown in FIG. 9C, when the vibration 92*a* is transmitted to the liquid film 103 in a state in which the entire frozen film 101*a* is thawed, the vibration 92*a* is transmitted to the pattern 100*c*.

The pattern 100*c* is a fine uneven portion or the like, and therefore has low rigidity. Therefore, when the vibration 92*a* is transmitted to the pattern 100*c*, there is a risk that damage of the pattern 100*c* may occur as shown in FIG. 9C.

In such a case, if the occurrence of the damage of the pattern 100*c* is suppressed by simply reducing the energy of the vibration 92*a*, re-adhesion of the detached foreign matter 300 to the front surface 100*b* of the substrate 100, etc., easily occurs.

Here, it can be seen from FIG. 9B that the pattern 100*c* at the front surface 100*b* of the substrate 100 is being held by the frozen film 101*a* under the liquid film 103. If the pattern 100*c* is held by the frozen film 101*a*, the occurrence of damage of the pattern 100*c* can be suppressed even when the vibration 92*a* is transmitted to the pattern 100*c*.

Therefore, in the substrate treatment apparatus 1 according to the embodiment, the detecting part 10 directly or indirectly detects the position of the upper surface of the remaining frozen film 101*a* under the liquid film 103. Also, as described above, when the detecting part 10 is not included, the position of the upper surface of the remaining frozen film 101*a* under the liquid film 103 is indirectly detected based on the time from the start of the thawing.

Also, when the distance between the upper surface of the frozen film 101*a* and the front surface 100*b* of the substrate 100 is greater than a prescribed value, the energy of the vibration 92*a* is increased as shown in FIG. 7. If the energy of the vibration 92*a* is large, re-adhesion to the front surface 100*b* of the substrate 100 of the detached foreign matter 300, etc., can be effectively suppressed. In such a case, the pattern 100*c* is held by the frozen film 101*a*, and so the occurrence of damage of the pattern 100*c* can be suppressed.

Also, when the distance between the upper surface of the frozen film 101*a* and the front surface 100*b* of the substrate 100 is less than a prescribed value, the energy of the vibration 92*a* is reduced as shown in FIG. 7, or the vibration 92*a* is stopped as illustrated by the single dot-dash line in FIG. 7.

In other words, the controller 11 controls the vibrating part 9 to reduce the energy of the vibration 92*a* transmitted to the liquid film 103 or stops the vibration 92*a* according to the position of the upper surface of the frozen film 101*a* under the liquid film 103. By reducing the energy of the vibration 92*a* for stopping the vibration 92*a*, the occurrence of damage of the pattern 100*c* can be suppressed even when the pattern 100*c* is exposed from under the frozen film 101*a*.

In such a case, the controller 11 controls the circuit 93 to switch the energy of the vibration 92*a* of the transducer 92 or stop the vibration 92*a* of the transducer 92. For example, the energy of the vibration 92*a* can be controlled by changing at least one of the amplitude or the angular frequency.

Also, when reducing the energy of the vibration 92*a*, for example, the energy can be 10% to 50% of the energy of the vibration 92*a* when starting the thawing of the frozen film 101*a*. Also, the energy of the vibration 92*a* may be reduced gradually or in stages according to the change of the position of the upper surface of the frozen film 101*a*.

Figure 10A:
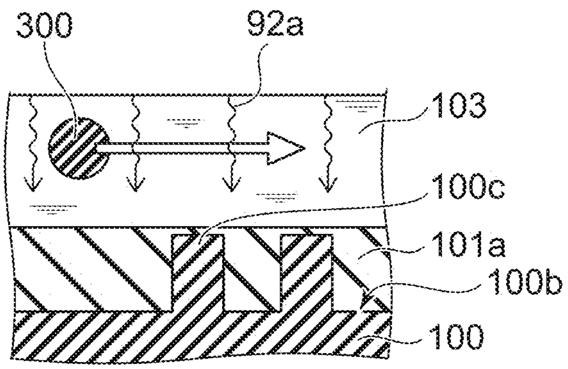
FIGS. 10A to 10C are schematic cross-sectional views illustrating a position of an upper surface of a frozen film when switching the energy of a vibration or stopping the vibration.
Figure 10B:
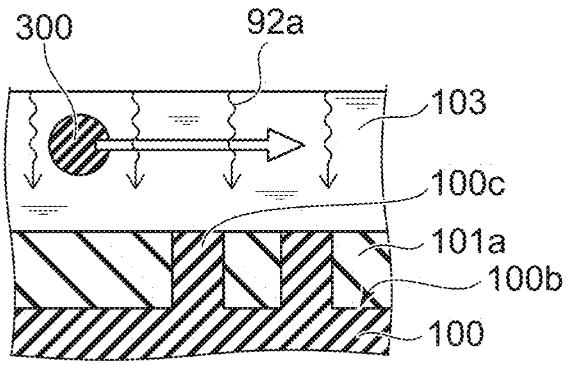
Figure 10C:
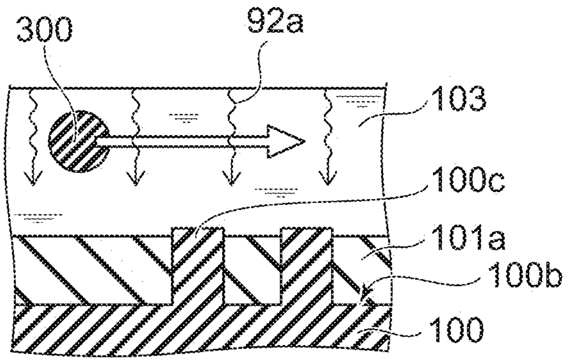

FIGS. 10A to 10C are schematic cross-sectional views illustrating the position of the upper surface of the frozen film 101*a* when the energy of the vibration 92*a* is switched or the vibration 92*a* is stopped.

When the substrate 100 is, for example, an EUV (Extreme Ultraviolet) mask, a semiconductor wafer, etc., there are cases where the pattern 100*c* has a multilayer structure in which multiple films are stacked. In such a case, there is a risk that the layer at the tip of the pattern 100*c* may be detached when the tip of the pattern 100*c* is exposed at the upper surface of the frozen film 101*a*. Therefore, when the pattern 100*c* has a multilayer structure, the energy of the vibration 92*a* can be reduced or the vibration 92*a* can be stopped at the timing at which the distance between the upper surface of the frozen film 101*a* and the front surface 100*b* of the substrate 100 is slightly greater than the distance between the tip of the pattern 100*c* and the front surface 100*b* of the substrate 100 as shown in FIG. 10A. Also, as shown in FIG. 10B, the energy of the vibration 92*a* can be reduced or the vibration 92*a* can be stopped at the timing at which the distance between the upper surface of the frozen film 101*a* and the front surface 100*b* of the substrate 100 is equal to the distance between the tip of the pattern 100*c* and the front surface 100*b* of the substrate 100. Thus, even when the pattern 100*c* has a multilayer structure, the occurrence of damage of the pattern 100*c* can be suppressed.

Also, there are cases where the pattern 100*c* has a single-layer structure when the substrate 100 is, for example, a phase shift mask, an imprint template, a plate-shaped body used in MEMS, etc. If the pattern 100*c* has a single-layer structure, for example, the energy of the vibration 92*a* can be reduced or the vibration 92*a* can be stopped at a timing at which the distance between the upper surface of the frozen film 101*a* and the front surface 100*b* of the substrate 100 is less than the distance between the tip of the pattern 100*c* and the front surface 100*b* of the substrate 100 as shown in FIG. 10C. If the pattern 100*c* has a single-layer structure, the occurrence of damage of the pattern 100*c* can be suppressed even when the tip of the pattern 100*c* is somewhat exposed at the upper surface of the frozen film 101*a* because there is no detachment such as that of a multilayer structure. Even when the pattern 100*c* has a single-layer structure, the energy of the vibration 92*a* can be reduced or the vibration 92*a* can be stopped at the timings of the positions of the upper surface of the frozen film 101*a* illustrated in FIGS. 10A and 10B.

In other words, when the position of the upper surface of the frozen film 101*a* reaches the vicinity of the position of the tip of the pattern 100*c*, the controller 11 can control the vibrating part 9 to reduce the energy of the vibration 92*a* transmitted to the liquid film 103 or stop the vibration 92*a*.

As described above, the position of the upper surface of the frozen film 101*a* when the energy of the vibration 92*a* is switched or the vibration 92*a* is stopped can be modified according to the structure of the pattern 100*c*. In such a case, diverse structures of the pattern 100*c* can be accommodated by switching the energy of the vibration 92*a* or stopping the vibration 92*a* at the position of the upper surface of the frozen film 101*a* illustrated in FIG. 10B.

As described above, the processing method of the substrate 100 according to the embodiment is a processing method of the substrate 100 of removing the foreign matter 300 from the front surface 100*b* of the substrate 100 by forming the frozen film 101*a* at the front surface 100*b* of the substrate 100, incorporating, into the frozen film 101*a*, the foreign matter 300 adhered to the front surface 100*b* of the substrate 100, and thawing the frozen film 101*a* including the foreign matter 300.

The processing method of the substrate 100 can include the following processes.

A process of supplying a liquid to the frozen film 101*a* including the foreign matter 300.

A process of transmitting a vibration from the vibrating part 9 facing the frozen film 101*a* to the liquid film 103, which includes the liquid 102 (the liquid 101) supplied to the frozen film 101*a* and the liquid (the liquid 101) generated by the thawing of the frozen film 101*a*.

Also, in the process of transmitting the vibration to the liquid film 103, the energy of the vibration transmitted to the liquid film 103 is reduced or the vibration is stopped according to the position of the upper surface of the frozen film 101*a* under the liquid film 103.

The content of the processes can be similar to that described above, and a detailed description is therefore omitted.

Embodiments are illustrated above. However, the invention is not limited to these descriptions. Additions, deletions, or design modifications of components or additions, omissions, or condition modifications of processes of the embodiments above appropriately made by one skilled in the art also are within the scope of the invention to the extent that the features of the invention are included.

For example, the shapes, dimensions, numbers, arrangements, etc., of the components included in the substrate treatment apparatus 1 are not limited to the examples and can be modified as appropriate.

The invention claimed is:

1. A substrate treatment apparatus removing foreign matter from a surface of a substrate by forming a frozen film at the surface of the substrate, incorporating, into the frozen film, the foreign matter adhered to the surface of the substrate, and thawing the frozen film including the foreign matter, the substrate treatment apparatus comprising:

- a liquid supply part supplying a liquid to the frozen film including the foreign matter;
- a vibrating part facing the frozen film; and
- a controller controlling the liquid supply part and the vibrating part,
- the controller controlling the vibrating part to
  - transmit a vibration to a liquid film, the liquid film including
    - the liquid supplied to the frozen film, and
    - a liquid generated by the thawing of the frozen film, and
  - according to a position of an upper surface of the frozen film under the liquid film, reduce an energy of the vibration transmitted to the liquid film or stop the vibration.

2. The substrate treatment apparatus according to claim 1, further comprising:

- a detecting part directly or indirectly detecting the position of the upper surface of the frozen film.

3. The substrate treatment apparatus according to claim 2, wherein

- the detecting part is an optical sensor detecting the position of the upper surface of the frozen film.

4. The substrate treatment apparatus according to claim 3, wherein

- the optical sensor irradiates light on the liquid film, and
- the optical sensor receives light reflected by an interface between the liquid film and the frozen film.

5. The substrate treatment apparatus according to claim 2, wherein

- the detecting part is a displacement meter detecting a position of an upper surface of the liquid film.

6. The substrate treatment apparatus according to claim 5, wherein

- the controller calculates the position of the upper surface of the frozen film based on a relationship and the position of the upper surface of the liquid film detected by the detecting part, the relationship being predetermined, the relationship being between the position of the upper surface of the liquid film and the position of the upper surface of the frozen film under the liquid film.

7. The substrate treatment apparatus according to claim 2, wherein

- the detecting part is a thermometer detecting a temperature of the liquid film.

8. The substrate treatment apparatus according to claim 7, wherein

- the controller calculates the position of the upper surface of the frozen film based on a relationship and a temperature of an upper surface of the liquid film detected by the detecting part, the relationship being predetermined, the relationship being between the temperature of the upper surface of the liquid film and the position of the upper surface of the frozen film under the liquid film.

9. The substrate treatment apparatus according to claim 1, wherein

- the position of the upper surface of the frozen film is detected based on a time from starting the supply of the liquid by the liquid supply part.

10. The substrate treatment apparatus according to claim 9, wherein

- the controller calculates the position of the upper surface of the frozen film based on a relationship and the time from starting the supply of the liquid, the relationship being predetermined, the relationship being between the time from starting the supply of the liquid and the position of the upper surface of the frozen film under the liquid film.

11. The substrate treatment apparatus according to claim 1, wherein

- the controller controls the vibrating part to gradually reduce the energy of the vibration or to reduce the energy of the vibration in stages.

12. The substrate treatment apparatus according to claim 1, wherein

- a pattern is provided in the surface of the substrate, and when the position of the upper surface of the frozen film is at a vicinity of a position of a tip of the pattern, the controller controls the vibrating part to reduce the energy of the vibration transmitted to the liquid film or stop the vibration.

13. The substrate treatment apparatus according to claim 1, wherein the vibrating part transmits the vibration to the liquid film from a direction crossing the surface of the substrate.

14. The substrate treatment apparatus according to claim 1, wherein the vibrating part includes:

a vibrating body; and a transducer applying the vibration to the vibrating body.

15. The substrate treatment apparatus according to claim 14, wherein the vibrating body includes quartz, and the transducer is a piezoelectric element.

16. The substrate treatment apparatus according to claim 14, wherein at least one groove is provided in an end portion of the vibrating body at the substrate side, and the at least one groove is open at the end portion.

17. The substrate treatment apparatus according to claim 16, wherein a side surface of the groove is inclined with respect to the end portion.

18. The substrate treatment apparatus according to claim 1, wherein the controller controls the liquid supply part and the vibrating part to transmit the vibration to the liquid film simultaneously with starting the supply of the liquid to the frozen film or after starting the supply of the liquid.

19. The substrate treatment apparatus according to claim 1, wherein the controller controls the liquid supply part and the vibrating part to stop transmitting the vibration to the liquid film simultaneously with stopping the supply of the liquid or before stopping the supply of the liquid.

20. A processing method of a substrate, the method including removing foreign matter from a surface of a substrate by forming a frozen film at the surface of the substrate, incorporating, into the frozen film, the foreign matter adhered to the surface of the substrate, and thawing the frozen film including the foreign matter, the method comprising:

supplying a liquid to the frozen film including the foreign matter; and transmitting a vibration from a vibrating part facing the frozen film to a liquid film, the liquid film including the liquid supplied to the frozen film, and a liquid generated by the thawing of the frozen film, the transmitting of the vibration to the liquid film including reducing an energy of the vibration transmitted to the liquid film or stopping the vibration according to a position of an upper surface of the frozen film under the liquid film.

* * * * *